(No Model.)
E. SHOBE.
COFFEE OR TEA POT.
No. 424,361.  Patented Mar. 25, 1890.
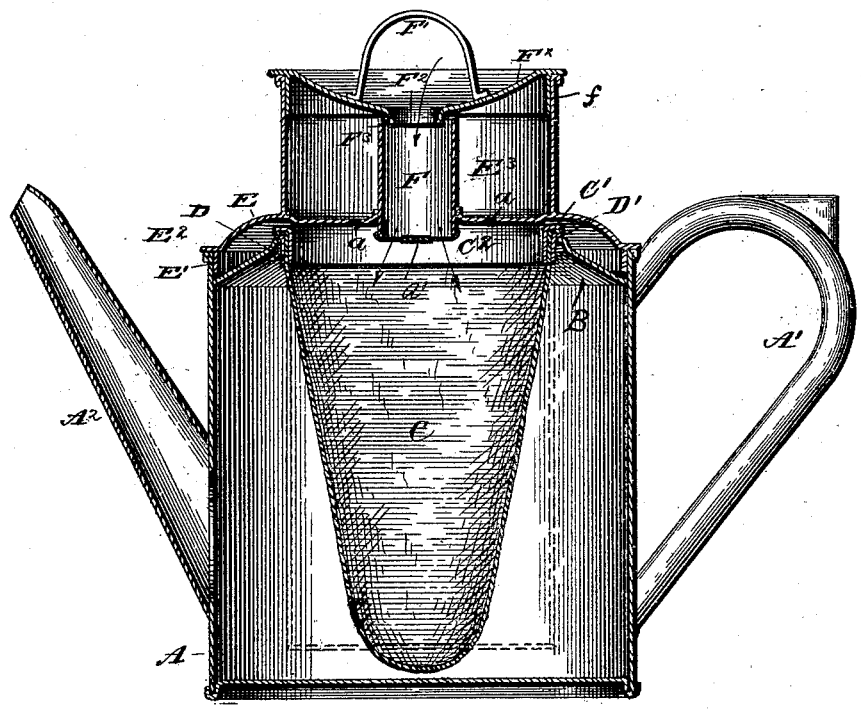

United States Patent Office.

EDWARD SHOBE, OF LOUISVILLE, KENTUCKY, ASSIGNOR OF ONE-HALF TO WILLIAM A. BARRINGTON, OF SAME PLACE.

COFFEE OR TEA POT.

SPECIFICATION forming part of Letters Patent No. 424,361, dated March 25, 1890.

Application filed November 14, 1889. Serial No. 330,308. (No model.)

*To all whom it may concern:*

Be it known that I, EDWARD SHOBE, a citizen of the United States, residing at Louisville, in the county of Jefferson, State of Kentucky, have invented certain new and useful Improvements in Tea or Coffee Pots, of which the following is a specification, reference being had therein to the accompanying drawing.

This invention relates to certain new and useful improvements in coffee or tea pots; and it has for its object, among others, to provide an improved tea or coffee pot so constructed that it retains all the aroma and strength of the coffee, providing a condenser and a shield to prevent the contents of the pot from running over the top of the pot in pouring.

The novelty resides in the peculiarities of construction and the combinations, arrangement, and adaptation of parts, all as more fully hereinafter described, shown in the drawing, and then particularly pointed out in the appended claims.

The invention is clearly illustrated in the accompanying drawing, which, with the letters of reference marked thereon, forms a part of this specification, and in which is shown a vertical section through my improved pot.

Referring now to the details of the drawing by letter, A designates the body of the pot, which may be of any suitable or desired design, either with straight or flaring walls. It is provided with a suitable handle $A'$ and a discharge spout or nozzle $A^2$.

Near the upper end of the body of the pot there is an interior upwardly-flaring flange or shield B, provided centrally with an opening, the wall surrounding said opening being substantially in the same plane as the upper edge of the body of the pot and forming a rest or support for the ring carrying the sack or bag hereinafter described. The sack or bag C is of any suitable material, and at its upper end is held between two rings $C^2$ and D, having at their upper edges each an annular outwardly-extending flange $C'$ and $D'$, respectively. The upper end of the bag is held between the rims and flanges of these rings, as shown in the drawing, the flanges being designed to rest upon the wall surrounding the opening in the shield, as shown in the drawing. The sack and rings may be readily removed, when desired, and the two rings separated to detach the sack for the purpose of cleaning or for replacing it by a new one, or for any other purpose.

E is a cover having a depending flange or rim $E'$ to fit within the body of the pot and with an annular flange $E^2$ to rest upon the upper edge thereof. This cover is formed with a chamber $E^3$ for a purpose hereinafter set forth, and through the bottom of this chamber passes a tube F, which extends up within the chamber and a short distance below the bottom thereof, as shown. The closed end of this tube is perforated, or it may be covered with a piece of perforated material—such, for instance, as wire-gauze—the center portion $a'$ of which, however, is rendered imperforate—for instance, by a little solder or in any other suitable manner. The bottom of this chamber is preferably provided with a number of small holes, as shown at $a$, to allow the water to trickle through into the sack. The cover E is provided with a lid $F^\times$, concave, as shown, and provided with a suitable handle $F'$, by which it may be manipulated when desired. This lid has a central depressed opening $F^2$, with a depending flange $F^3$, adapted to enter within the upper end of the tube F. This lid has a depending rim $f$, adapted to enter tightly within the upper end of the cover, as shown.

The operation of my improved coffee-pot is as follows: The coffee being ground is placed within the sack and the latter placed in position, as shown. Cold water is then placed in the chamber $E^3$ and boiling water poured in through the hole in the lid upon the coffee in the sack. The water in passing through the tube F is scattered evenly over the coffee in the sack. The shield or flange B serves to condense the steam within the pot, and the condenser-chamber $E^3$, being immediately over the center of the pot and of substantially the same size as the opening in the shield or flange B, serves to condense the steam, and thereby retains all the aroma and strength of the coffee.

What I claim as new is—

1. The combination, with the coffee-pot provided with a support having central aperture, of a flexible sack depending within the pot through said aperture, and a condensing-chamber above said sack having a passage therethrough communicating with the interior of the sack, substantially as described.

2. The combination, with the coffee-pot and the flexible sack therein, of the condensing-chamber above the sack, and the tube passed through said chamber and provided with a partly-perforated bottom, substantially as described.

3. The combination, with the coffee-pot and its support, of the sack, the condensing-chamber above the flexible sack, and the tube passed through the chamber and having a partly-perforated bottom, the central portion of which is imperforate, substantially as and for the purpose specified.

4. The combination, with the coffee-pot and its support, of the sack, the condensing-chamber above the flexible sack, the tube passed through the said chamber and having a perforated bottom, and the lid to said chamber concaved and provided with a central depressed opening, substantially as described.

5. The combination, with the coffee-pot formed with a support near its upper end, of the flexible sack held between the rings, as shown, and supported by the shield, the condensing-chamber above the sack, the tube passed through the chamber and provided with perforations in its bottom surrounding an imperforate portion near its center, and the lid to said chamber having a concave upper face and a central depressed opening with a depending flange extending within the tube, as set forth.

In testimony whereof I affix my signature in presence of two witnesses.

EDWARD SHOBE.

Witnesses:
D. P. CURRY,
JAMES C. WILSON.